April 12, 1927.

M. P. HOLMES 1,624,837

BEARING

Filed June 17, 1921

Inventor:
Morris P. Holmes.
by
Horace L. [illegible]
Att'y.

Patented Apr. 12, 1927.

1,624,837

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

BEARING.

Application filed June 17, 1921. Serial No. 478,423.

This invention relates to mountings for gears and similar rotating members.

The invention has for an object to provide improved means whereby a plurality of interconnected coaxially disposed members may be held in assembled relation by means of a single clamping bolt or the like, loosening of which permits the parts to be completely disassembled and removed. Another object of the invention is to provide a mounting for gears and similar members whereby adjustment of said members to compensate for wear or otherwise is facilitated. A more particular object of the invention is to provide an improved mounting for the connected spur and bevel gears forming part of the train of mechanism for actuating the cutter chain in a mining machine of a well known type, whereby said gears may be readily removed from their common bearing or may be easily adjusted therein from a conveniently accessible point.

The foregoing and other objects of the invention, together with means whereby the same may be carried into effect, will best be understood from the following description of one form or embodiment thereof, illustrated in the accompanying drawings, in which.

Figure 1:
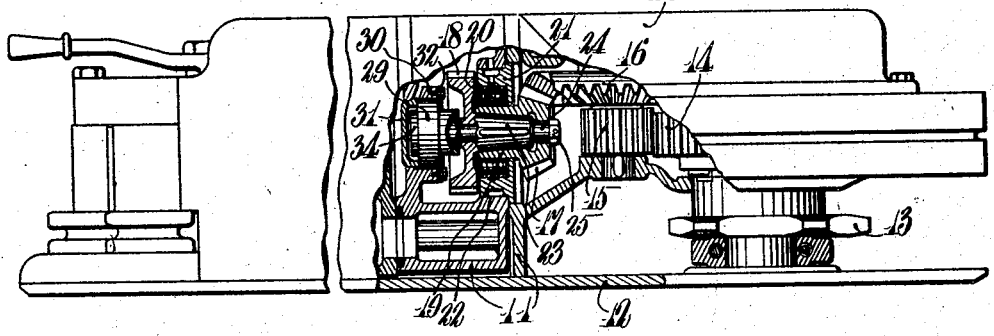
Fig. 1 is a side elevation, partly broken away and partly in longitudinal section, of a mining machine embodying the invention.
Figure 2:
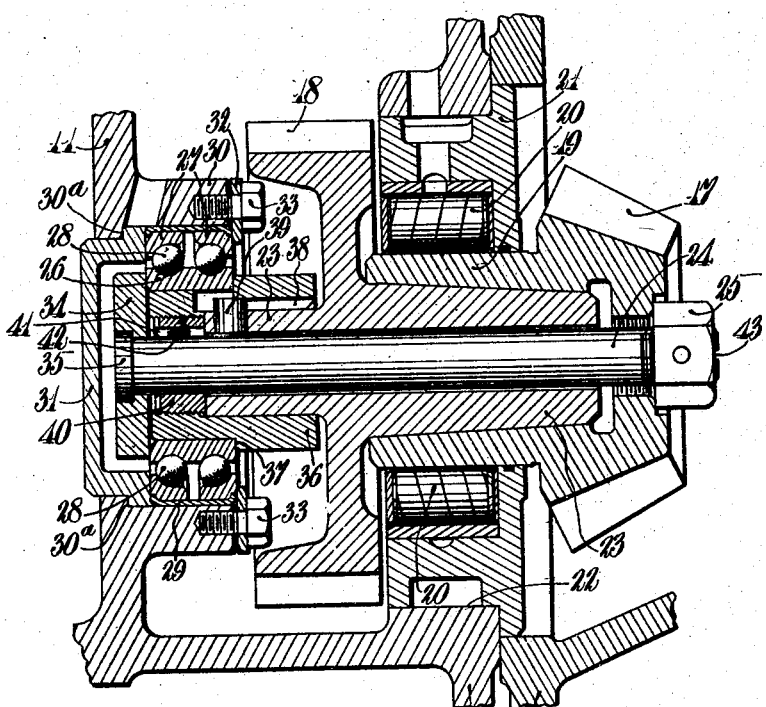
Fig. 2 is an enlarged longitudinal section of the gear mounting in which the invention resides.

The invention is herein shown as embodied in a mining machine of well-known type, comprising a casing 10 enclosing a frame 11 suitably constructed and arranged to provide the necessary supports for the various parts of the machine, said frame being preferably formed in several sections to facilitate the handling thereof and the assembling of the several parts, and being supported upon the usual shoe 12 upon which the machine is adapted to move over the mine floor. The various instrumentalities of the mining machine for the most part form no portion of the present invention and may be of any usual construction and arrangement. As herein shown, said instrumentalities include a cutter chain sprocket 13 operatively connected with and rotated by a coaxially disposed gear 14 which meshes with a pinion 15 connected for rotation with a bevel gear 16, the latter gear cooperating with a bevel gear or pinion 17 connected for rotation with a coaxially disposed spur gear 18 which meshes with a pinion on the shaft of the driving motor (not shown) or is otherwise operatively connected with said motor. The gear or pinion 17 is formed with a hub 19 rotatably mounted in an antifriction bearing 20 carried by a plate 21 bolted or otherwise secured in an opening 22 in the frame 11, said opening being disposed coaxially with the gear 18 and having a diameter equal to or slightly greater than said gear. The parts thus far referred to are, as to their general arrangement, usual in machines of the type shown and require no further description.

In accordance with the present invention, the hub 19 of the gear or pinion 17 is internally tapered to receive an externally tapered hub 23 on the gear 18 which in turn receives or is mounted on a coaxially disposed shaft or bolt 24 having a threaded outer end to receive a nut 25 engaging the outer side or end of said gear or pinion 17. The inner end of the shaft or bolt 24 is journaled in an antifriction bearing including a bearing member 26, herein shown as a ball race, connected, by means hereinafter described, with the gears 17 and 18 and rotatable therewith, and fixed bearing members or ball races 27 between which and the ball race 26 are interposed the usual balls 28. The fixed bearing members or ball races 27 are carried by a retaining ring 29 located in a hollow, cylindrical portion 30 of the frame 11, said cylindrical frame portion being closed at its inner end by a cap 31 having a shouldered edge to engage an interior shoulder 30ª on said frame portion, and said retaining ring and cap being held seated in said frame portion by means of a clamping ring 32 secured to the outer end of said frame portion by cap screws 33. The nut or bolt 24 is provided at its inner end, within the cap 31, with an abutment, herein shown as a collar 34 retained on said shaft by a head or flange 35 formed on the inner end of the latter. The hub 23 of the gear 18 extends beyond the inner side thereof, or the side opposite the gear 17, and has mounted thereon a sleeve 36 formed with an exterior shoulder 37 between which and the abutment collar 34 the rotating bearing member or ball race 26 is clamped. The sleeve 36 is formed with a longitudinally disposed internal groove 38 which receives a pin or stud 39 carried by the hub 23, whereby said sleeve and hub are connected for rotation in unison but are permitted relative longitudinal movement. Within the inner end of the sleeve 36, and in threaded engagement therewith, is a bushing 40 which bears at its outer end against the inner end of the hub 23, and which is formed with a longitudinally extending internal groove 41 to receive a pin or stud 42 on the shaft or bolt 24, whereby said parts are connected for rotation in unison but are permitted relative longitudinal movement.

As will now be seen, all of the coaxially disposed rotating parts of the mounting are held in assembled relation by a single clamping device comprising the bolt 24 with its nut 25. Thus it will be seen that tightening of the nut 25 tends to draw the bolt with its abutment collar 34 outwardly, at the same time forcing inwardly the gears 17 and 18, thereby causing the inner end of the hub 23 of the latter gear to engage and force inwardly the bushing 40 which, by threaded engagement with the sleeve 36, forces the latter inwardly to clamp, between the shoulder 37 thereon and the abutment collar 34, the rotating bearing member 26. It will accordingly be seen that, by removing the nut 25, which is at the outer side of the gear 17 and readily accessible, the gear 17 may be withdrawn from the bearing 20, permitting the removal of the plate 21 in the usual manner, which, in turn, permits the withdrawal of the gear 18, sleeve 36, and bushing 40, thereby rendering accessible the screws 33 in order to permit the removal of the inner bearing members and with them the shaft or bolt 24.

The construction shown also permits ready adjustment of the gear 17 inwardly and outwardly with respect to the bearing 26, 27, 28, by means accessible from the outer side of said gear. Thus it will be observed that, by loosening the nut 25 and turning the shaft or bolt 24 with respect to the gear 17, the bushing 40 will be turned in the sleeve 36 which, by engagement with the bearing member 26, provides a longitudinally fixed abutment for said bushing, thereby moving said bushing (which fixes the longitudinal position of the gears 17 and 18 on the shaft or bolt 24) inwardly or outwardly, consequently varying the position of said gears, which are thereafter clamped in re-adjusted position by tightening the nut 25. In order to facilitate the turning of the shaft or bolt 24 for the purpose of thus adjusting the parts, said shaft or bolt is formed at its outer end with means, such as a transverse slot 43, for engagement by a suitable tool.

From the foregoing it will be seen that the invention provides an extremely convenient mounting for a plurality of coaxially disposed rotating parts, and particularly for a gear and its connected rotating bearing member, in which the parts are held in assembled relation by a single clamping device readily accessible for the purpose of releasing and disassembling said parts and also operable from a conveniently accessible point to adjust said parts with respect to one another.

While I have in this specification shown and described in detail one form which my invention may assume in practice, it will be understood that the particular construction and arrangement described and shown has been chosen for illustrative purposes merely, and that the invention may be otherwise embodied and practiced without departing from its spirit or the scope of the claims hereunto appended.

What I claim as new and desire to secure by Letters Patent is:—

1. The combination with a rotatable power transmission member and bearing means therefor, of means located at one side of said member and operable from the opposite side thereof for adjusting said member longitudinally in either direction and maintaining the same in different adjusted positions relative to said bearing means including an element extending to opposite sides of said member and occupying a fixed position as regards movement longitudinally of said bearing means.

2. The combination with a rotatable power transmission member and bearing means therefor, of means located at one side of said member and operable from the opposite side thereof for adjusting said member longitudinally in either direction and maintaining the same in different adjusted positions relative to said bearing means including an element extending to opposite sides of said member and along which said member moves on adjustment relative to said bearing means.

3. The combination with a rotatable power transmission member and bearing means therefor, of means located at one side of said member and operable from the opposite side thereof for adjusting said member longitudinally in either direction and maintaining the same in different adjusted positions relative to said bearing means including an element extending to opposite sides of said member and occupying a fixed position as regards longitudinal movement relative to said bearing means, and a member on said element at the first mentioned side of said rotary member.

4. The combination with a rotatable power transmission member and bearing means therefor, of means located at one side of said member and operable from the opposite side thereof for adjusting said member longitudinally in either direction and maintaining the same in different adjusted positions relative to said bearing means including an element extending to opposite sides of said member, and a member on said element at the first mentioned side of said rotary member, said parts being so related that adjustment of said first mentioned member relative to said bearing means is accompanied by adjustment along said element.

5. The combination with a rotatable power transmission member and bearing means therefor, of means located at one side of said member and operable from the opposite side thereof for adjusting said member longitudinally in either direction and maintaining the same in different adjusted positions relative to said bearing means including an element extending to opposite sides of said member and occupying a fixed position as regards longitudinal movement relative to said bearing means, and a member on said element at the first mentioned side of said rotary member operable by relative angular movement of said element and rotary member to cause such adjustment.

6. The combination with a rotatable power transmission member and bearing means therefor, of means located at one side of said member and operable from the opposite side thereof for adjusting said member longitudinally in either direction and maintaining the same in different adjusted positions relative to said bearing means including an element extending to opposite sides of said member, and a member on said element at the first mentioned side of said rotary member operable by relative angular movement of said element and rotary member to cause such adjustment, said parts being so related that adjustment of said member relative to said journal means is accompanied by adjustment along said element.

7. The combination with a rotary power transmission member and an element coaxial with said member, of means located at one side of said member and operable from the opposite side thereof for adjusting said member longitudinally along said element in either direction and maintaining the same in its different adjusted positions irrespective of the direction of adjustment.

8. The combination with a rotary power transmission member and an element on which said member is rotatably mounted, of a longitudinally fixed abutment, and a bushing in engagement with said abutment and engaging said rotary member, said bushing being connected with said element for rotation therewith and being longitudinally movable thereon.

9. The combination with a rotary power transmission member and a bearing therefor including a bearing member normally rotating with said rotary member, of a single clamping device for holding said members in assembled relation and operable to effect relative adjustment of said members in either direction while the latter are in operative position, said elements being so related that relative adjustment is accompanied by adjustment of said rotary member along an element of said clamping device.

10. The combination with a gear having an externally tapered hub, a second gear having an internally tapered hub seated on the hub of said first named gear, and a bearing for said gears including a bearing member rotatable therewith, and a single clamping device for holding said gears and bearing member in assembled relation and adjustable to effect movement of said gears longitudinally relative to said bearing member and to itself.

11. The combination with a rotary power transmission member and a bearing therefor including a bearing member rotatable therewith, of a bolt having an abutment at one end, means at the opposite end of said bolt to clamp said rotary member, and means interposed between said rotary and bearing members to clamp said bearing member against said abutment.

12. The combination with a rotary power transmission member and a bearing therefor including a bearing member rotatable therewith, of a bolt having an abutment at one end, a nut on the opposite end of said bolt to clamp said rotary member, and means interposed between said rotary and bearing members to clamp said bearing member against said abutment.

13. The combination with a rotary power transmission member and a bearing therefor including a bearing member rotatable therewith, of a bolt having an abutment at one end, means at the opposite end of said bolt to clamp said rotary member, and means interposed between said rotary and bearing members and operable by rotation of said bolt to clamp said bearing member against said abutment.

14. The combination with a rotary power transmission member and a bearing therefor including a bearing member rotatable with said member, of a rotatable shaft having an abutment at one end engaging said bearing member and means at its opposite end to rotate said shaft or clamp said rotary member thereto, and operative connections between said shaft and bearing member including an element rotatable with said shaft and adjustable longitudinally thereof and of said bearing member.

15. The combination with a rotary power transmission member and a bearing therefor including a bearing member rotatable with said member, of a rotatable shaft having an abutment at one end engaging said bearing member and means at its opposite end to rotate said shaft or clamp said rotary member, and operative connections between said shaft and bearing member rotatable with said shaft and adjustable longitudinally thereof and of said bearing member including a threaded member adjustable relative to said bearing member and splined to said shaft.

16. The combination with a rotary power transmission member and a bearing therefor including a bearing member rotatable with said member, of a rotatable shaft having an abutment at one end engaging said bearing member and means at its opposite end to rotate said shaft or clamp said rotary member, and cooperating means between said shaft and bearing member rotatable with said shaft and adjustable longitudinally thereof including a threaded member adjustable relative to said bearing member and splined to said shaft and a sleeve carrying said threaded member and rotatable with said rotary member relative to which the latter is longitudinally adjustable.

17. The combination with a rotary power transmission member and a bearing therefor including a bearing member rotatable with said member, of a rotatable shaft having an abutment at one end engaging said bearing member and means at its opposite end to rotate said shaft or clamp said rotary member, and operative connections between said shaft and bearing member rotatable with said shaft including a threaded member adjustable relative to said bearing member and splined to said shaft, a sleeve between said threaded member and bearing member, and a member intermediate said rotary member and said threaded member movable longitudinally with said rotary member and relative to said sleeve and rotatable with said member and sleeve.

18. The combination with a rotary power transmission member and a bearing therefor including a bearing member rotatable therewith, of a bolt having an abutment at one end, means at the opposite end of said bolt to clamp said rotary member, a sleeve rotatable with said rotary member for clamping said bearing member against said abutment, and a bushing in threaded engagement with said sleeve, said bushing engaging said rotary member and being connected with said bolt for rotation therewith.

19. In combination, a gear having an extended hub, a rotating bearing member therefor, a bolt extending coaxially through said hub and bearing member, said bolt having an abutment at the side of said bearing member opposite said gear, a nut on said shaft on the side of said gear opposite said bearing member, a sleeve on said hub and connected thereto for rotation therewith, said connection permitting relative longitudinal movement between said sleeve and hub, said sleeve having a shoulder for clamping said bearing member against said abutment, and a bushing having threaded engagement with said sleeve and engaging the end of said hub, said bushing being longitudinally movable on said bolt and being connected thereto for rotation therewith.

20. In combination, a rotary power transmission member, a rotary shaft therefor having an abutment and clamping means thereon, a bearing therefor including a bearing member rotatable with said rotary member and engaged by said abutment and a cooperating stationary bearing member, a casing in which said bearing is carried, removable means engaging the opposite sides of said stationary bearing member for holding the same in position in said casing, means cooperating with said abutment to hold said movable bearing member in position including a sleeve rotatable with said rotary member and relative to which the latter is longitudinally movable, and a threaded member rotatable with said shaft and threaded to said sleeve and engaging a portion rotatable with said rotary member.

21. In combination, a rotary power transmission member, a rotary shaft therefor having an abutment and clamping means thereon, a bearing therefor including a bearing member rotatable with said rotary member and engaged by said abutment and a cooperating stationary bearing member, a casing in which said bearing is carried, a removable means engaging the opposite sides of said stationary bearing member for holding the same in position in said casing, means cooperating with said abutment to hold said movable bearing member in position including a sleeve rotatable with said rotary member, a threaded member rotatable with said shaft and threaded to said sleeve, and a second rotary member rotatable with said rotary member and having a hub rotatable with and longitudinally adjustable relative to said sleeve and engaging said threaded member.

22. In combination, a rotary power transmission member, a rotary shaft therefor having an abutment, a bearing therefor including a bearing member rotatable with said rotary member and engaged by said abutment and a cooperating stationary bearing member, a casing in which said bearing is carried, removable means engaging the opposite sides of said stationary bearing member for holding the same in position in said casing, means cooperating with said abutment to hold said movable bearing member in position including a sleeve rotatable with said rotary member, a threaded member rotatable with said shaft and threaded to said sleeve, a second rotary member having a conical seat on said rotary member and having a hub rotatable with and longitudinally adjustable relative to said sleeve and engaging said threaded member, and means on said shaft for clamping the parts together.

In testimony whereof I affix my signature.

MORRIS P. HOLMES.